United States Patent [19]

Tansei et al.

[11] 4,449,560

[45] May 22, 1984

[54] HEAVY DUTY PNEUMATIC TIRE

[75] Inventors: Hikaru Tansei, Higashimurayama; Hiroyoshi Takigawa, Kodaira, both of Japan

[73] Assignee: Bridgestone Tire Company Limited, Tokyo, Japan

[21] Appl. No.: 374,824

[22] Filed: May 4, 1982

[30] Foreign Application Priority Data

May 13, 1981 [JP] Japan .............................. 56-68774[U]
May 13, 1981 [JP] Japan .............................. 56-68775[U]
May 13, 1981 [JP] Japan .............................. 56-68776[U]

[51] Int. Cl.³ .............................................. B60C 11/12
[52] U.S. Cl. ................................................ 152/209 R
[58] Field of Search .......... 152/209 R, 209 A, 209 D; D12/142, 143

[56] References Cited

U.S. PATENT DOCUMENTS

| | | | |
|---|---|---|---|
| 3,550,665 | 12/1970 | Verdier | 152/209 R |
| 4,271,885 | 6/1981 | Takigawa et al. | 152/209 R |
| 4,271,886 | 6/1981 | Bachmann et al. | 152/209 R |
| 4,305,445 | 12/1981 | Yoshioka | 152/209 R |

FOREIGN PATENT DOCUMENTS

| | | | |
|---|---|---|---|
| 55-140606 | 11/1980 | Japan | 152/209 D |
| 2030937 | 4/1980 | United Kingdom | 152/209 D |

Primary Examiner—Michael W. Ball
Attorney, Agent, or Firm—Sughrue, Mion, Zinn, Macpeak and Seas

[57] ABSTRACT

A heavy duty pneumatic tire includes a tread surface divided along circumferential directions by at least two zigzag tread grooves to form a plurality of circumferential zigzag ribs whose at least one side edge is formed with a plurality of narrow cuts opening into the tread grooves and substantially in parallel with an axial direction of the tire. According to the invention, lengths and/or depths of the narrow cuts are gradually reduced from the cuts in the extending corners to the cuts in the retracting corners of the ribs, or the narrow cuts are inclined relative to radial surfaces of the tire passing through openings of the cuts to make angles with their radial surfaces, the angles being progressively larger as the cuts are nearer the extending corners to mitigate railway wear of the tire without sacrificing other wear-resistant properties.

8 Claims, 7 Drawing Figures

HEAVY DUTY PNEUMATIC TIRE

BACKGROUND OF THE INVENTION

1. Field of the Invention

This invention relates to a heavy duty pneumatic tire. In particular it relates to a heavy duty pneumatic tire effectively eliminating railway wear often occurring in such a tire used for continuous travelling at high speeds for long distances.

2. Description of the Prior Art

In general, radial tires using metal cords for reinforcing belts have various advantages such as high wear-resistant property, punctureproof and the like because of the stiff belts arranged between tread rubbers and carcass plies different from usual bias tires. However, radial tires are uncomfortable in riding because of the reinforcing effect resulting from the stiff belts. Therefore, although the radial tires may be used on bad roads, they have been developed for good roads and have been remarkably widely used with the considerable improvement of road conditions such as the development and accomplishment of superhighways.

For these purposes, treads of these tires are in general formed with zigzag ribs extending in circumferential directions of the tires in consideration of the traction and braking performances and wear-resistant property and for preventing heating. Such tread patterns are generally referred to as "rib-type" pattern.

Such ribs are usually continuous in the circumferential directions of the tires but are discontinuous in the circumferential directions by traverse grooves in directions of tire widths interrupting the ribs as the case may be. In many cases, extraordinary wear (referred to as "irregular" wear hereinafter) tends to occur in the treads having such ribs in continuously straight running at high speeds for long distances.

As can be seen in more detail in FIG. 1, the irregular wear partially occurs in areas denoted by R in FIG. 1 from a first used stage to an intermediate stage. The irregular wear starts at corners 3, particularly point ends 3' of the circumferential ribs 2 extending in width directions of the tire into the zigzag tread grooves 1 extending in the circumferential directions of the tire and then expands along side edges 2' of the ribs 2 in the circumferential and width directions of the tire. The irregular wear then increases its width w with a depth $\partial$ as viewed in a section shown in FIG. 2 during the intermediate stage and thereafter. The worn areas R then progressively increase with the running distance of the tire beyond retracting corners 4 of the ribs 2 between the extending corners 3 so as to be joined with each other along side edges 2' of the circumferential ribs 2 to form continuous worn areas in the tread of the tire T. The depth $\partial$ and width w of the wear then further increase with running distances of the tire. Such an irregular wear is generally referred to as "railway" wear. The depressions at the edges of the tread grooves due to the railway wear make the tire unaesthetical and adversely affect the tire performance depending upon functions of the edges of the tread grooves 1, particularly the traction and braking performances to greatly reduce the life span.

It has been generally known that the railway wear is usually caused by stress concentrations in traverse directions in the proximity of the point ends 3' of the extending corners 3 of the circumferential ribs 2 in running at high speed. In view of this, various solutions have been proposed for overcoming the above disadvantages.

One solution is to provide a plurality of narrow cuts with circumferential intervals at least in side edges of circumferential ribs defined by circumferential grooves in a central zone of a tire tread as disclosed in U.S. Pat. Nos. 3,550,665 and 3,954,130. With such cuts having, for example, substantially the same length in the circumferential ribs, however, the cuts in the proximity of retracting corners of the ribs are longer than those required for this purpose, so that the rigidity of the circumferential ribs as a whole is reduced to shorten the life due to wear, or the cuts in the extending corners of the ribs in which the railway wear would start are insufficient in length to prevent the railway wear. Accordingly, such cuts are required to have suitable lengths, depths and so on.

SUMMARY OF THE INVENTION

It is an object of the invention to provide a heavy duty pneumatic tire having a tread pattern which deletes the disadvantages of the prior art and mitigates the railway wear with the aid of narrow cuts without sacrificing other wear-resistant properties.

The term "narrow cut" means herein a cut formed in a tread of a tire having a width which is narrow sufficiently to substantially close when the tire rolls under a load.

In general, a rigidity of the extending corner 3 of the circumferential rib 2 is less than that of the retracting corner 4. The larger the difference between the rigidities of the extending and retracting corners, the less the stress concentration in the traverse direction at the extending corners 3.

The invention lies in a discovery as a result of inventor's investigation in various viewpoints that the above disadvantages of the prior art can be deleted without increasing lengths and depths of the narrow cuts more than required by effectively reducing the rigidity of the extending corners where the railway wear would occur, by increasing the difference between the rigidities of the extending and retracting corners and continuously increasing the rigidity from the extending corners to the retracting corners without any abrupt rigidity difference.

In order to achieve the above object, according to the invention the narrow cuts are formed so as to substantially continuously increase a rigidity of the rib from extending corners to retracting corners of the rib without any abrupt rigidity difference.

In a preferred embodiment, lengths of the narrow cuts are gradually reduced from those in the extending corners to those in the retracting corners of the ribs.

In another embodiment, depths of the narrow cuts are gradually reduced from those in the extending corners to those in the retracting corners.

In a further embodiment, the narrow cuts between the extending and retracting corners are inclined relative to radial surfaces of the tire passing through openings of said cuts at the tread surface such that bottoms of the cuts are shifted away from the radial surfaces towards radial surfaces passing through the extending corners to make angles with their radial surfaces, the angles being progressively larger as the cuts are nearer the extending corners.

In order that the invention may be more clearly understood, preferred embodiments will be described, by way of example, with reference to the accompanying drawings.

BRIEF DESCRIPTION OF THE DRAWINGS

FIG. 4b is a sectional view of the rib taken along lines IVb—IVb in FIG. 4a;

FIG. 5b is a sectional view of the rib taken along lines Vb—Vb in FIG. 5a.

DETAILED DESCRIPTION OF THE PREFERRED EMBODIMENT

Figure 3:
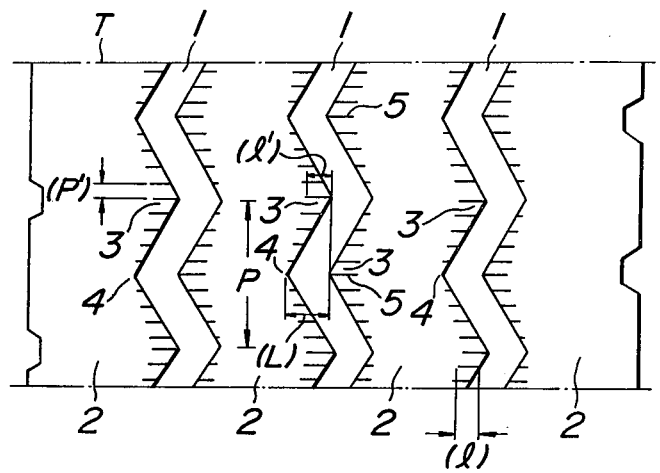
FIG. 3 is a development view of a tread pattern illustrating one embodiment of the tire according to the invention.

FIG. 3 illustrates a tread pattern of a tire in a development view of one embodiment of the invention. This tire is for a bus or truck and its size is indicated by 10.00 R20, 14PR. Its carcass consists of one layer of radial plies comprising metal cords. Its breaker has a general construction consisting of four layers of rubber coated plies of metal cords crossing one another at angles of 15°-20° to a circumferential direction of the tire. The tread of the tire T is circumferentially formed with narrow cuts 5 in side edges of circumferential ribs 2 with an interval and in parallel with an axial direction of the tire or perpendicular to a circumferential direction of the tire. It is preferable to provide the cuts 5 spaced apart a substantially equal distance in the circumferential direction or with a constant interval. Lengths l of the cuts are progressively reduced as they approach from extending corners 3 to retracting corners 4 of the ribs. The progressive reduction in length l of the cuts does not decrease the rigidity of the retracting corners 4 of the ribs 2 more than that is required for this purpose but sufficiently decreases the rigidity of the corners 3 without any conspicuous discontinuity of the rigidity of the ribs between the corners 3 and 4, whereby the railway wear can be effectively mitigated to a required and sufficient extent without sacrificing wear-resistant characteristics such as life associated with the wear of the tire and the like.

The length l of the cuts 5 at the extending corners of the ribs is the maximum l' which should be within 30-80% of the amplitude L of the zigzag of the circumferential grooves 1 in order to more effectively mitigate the railway wear. Moreover, it is preferable that the pitches P' or spaced distances of the cuts 5 in the circumferential direction between the extending and retracting corners 3 and 4 of the ribs 2 are 7.5-25% of the pitches P of the zigzag of the tread grooves 1.

Figure 4A:
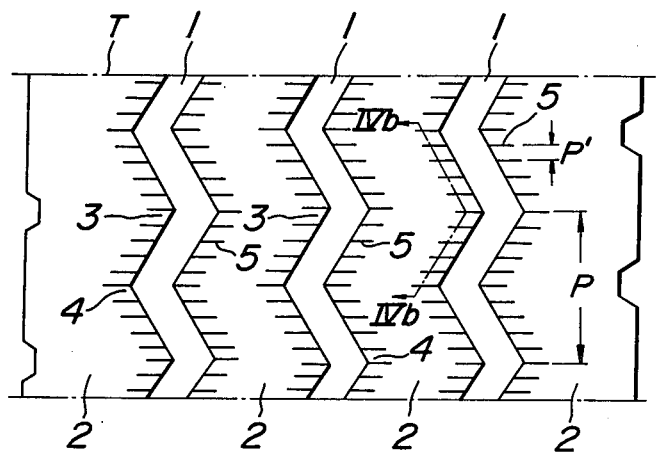
FIG. 4a is a development view of a tread pattern illustrating another embodiment of the tire according to the invention.
Figure 4B:
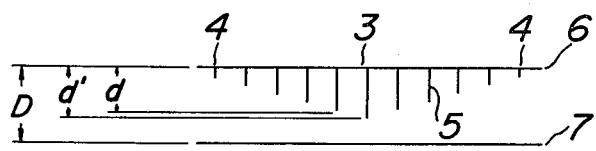

FIGS. 4a and 4b illustrate a tread pattern of a tire of another embodiment of the invention. The tire to which the embodiment is applied is the same in use, size, carcass and breaker as the tire of the first embodiment. In this embodiment, cuts 5 are also formed in side edges of circumferential ribs 2 in parallel with a direction perpendicular to a circumferential direction as shown in FIG. 4a. Depths d of cuts 5 are varied in a manner such that the depths of the cuts 5 in extending corners 3 of the ribs 2 are the maximum d' and the depths are shallower as the cuts are nearer retracting corners 4 as shown in FIG. 4b illustrating a section of a tread taken along lines IVb—IVb in FIG. 4a. The gradual decrease of the depths d sufficiently decreases the rigidity of the extending corners 3 and prevents a conspicuous discontinuity of the rigidity of the ribs between the extending corners 3 and retracting corners 4, so that the railway wear can be effectively mitigated to a required and sufficient extent without sacrificing wear-resistant characteristics such as life of the tire due to wear.

The maximum depth d' of the cuts 5 in the extending corners 3 of the ribs 2 should be 40-90% of a depth D of tread grooves 1 from a tire tread surface 6 to a bottom 7 of tread groove 1. A pitch P' of the cuts in a circumferential direction is preferably 7.5-25% of the pitches P of the zigzag of the tread grooves 1.

Figure 5A:
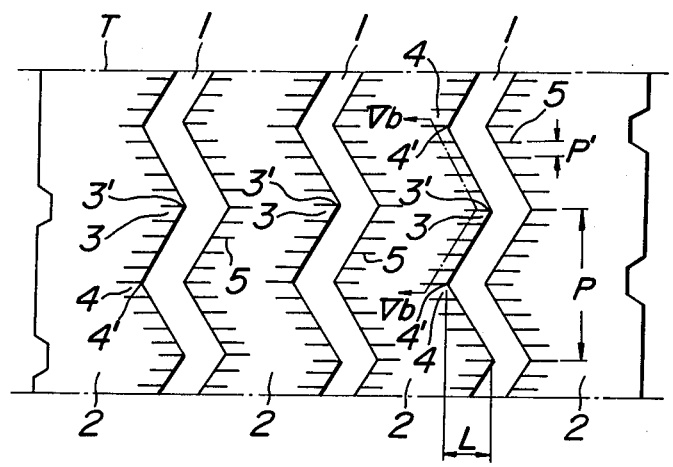
FIG. 5a is a development view of a tread pattern illustrating a further embodiment of the tire according to the invention.
Figure 5B:
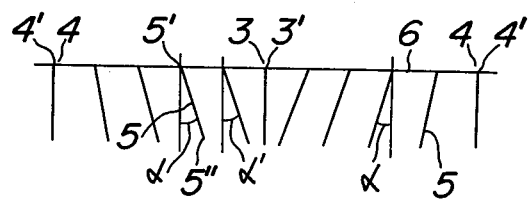

FIGS. 5a and 5b show a tread pattern of a tire of a further embodiment of the invention. This tire is identical with tires of the above mentioned embodiments except the arrangement of cuts in a tread. As shown in FIG. 5b, the cuts 5 in extending corners 3 and retracting corners 4 of the ribs 2 extend inwardly in radial surfaces of the tire, but the cuts 5 between the extending and retracting corners 3 and 4 are inclined relative to the radial surfaces of the tire passing through openings 5' of the cuts 5 at the tread surface 6 such that bottoms 5'' of the cuts are shifted away from their radial surfaces towards the radial surfaces passing through the extending corners 3 to make angles α with the radial surfaces. The angles are progressively larger as the cuts are nearer the extending corners. In such a case as this embodiment that point ends 3' of the extending corners 3 are provided with narrow cuts 5, the angles of the cuts at the point ends 3' are substantially zero (or in radial directions of the tire). In this embodiment, the point ends 4' of the retracting corners 4 are formed with cuts, and the angles thereof are also substantially zero.

This arrangement of the cuts in this embodiment does not increase lengths and depths of the cuts more than those required for the purpose of the cuts but sufficiently decrease the rigidity of the extending corners 3 of the ribs 2 without any conspicuous discontinuity of the rigidity of the ribs between the extending corners 3 and retracting corners 4, whereby railway wear can be effectively mitigated to a required and enough extent without sacrificing wear-resistant characteristics such as life of the tire due to wear.

The maximum angles α' of the cuts in the extending corners of the ribs 2 should be not more than 30° in order to more effectively prevent railway wear to a required and sufficient extent. It is preferable that pitches P' of the cuts 5 in the tire tread 6 in the circumferential direction of the tire are 7.5-25% of the pitches P of the zigzags of the tread grooves 1.

The depths of the cuts may be progressively decreased from the maximum depths of the cuts in the extending corners 3 within 40-90% of the depths D of the tread grooves 1 to shallower values of the cuts nearer the retracting corners 4. The lengths of the cuts may be progressively decreased from the maximum lengths of the cuts in the extending corners 3 within 30-80% of the amplitudes L of the zigzags of the tread grooves 1 to shorten lengths of the cuts nearer the corners 4. As an alternative, such gradual decreases in depth and length may be suitably combined to obtain a more effective result.

Experiments were effected for comparing the effects of the tires according to the invention with those of tires in the prior art.

We used tires for the experiments, whose size is 10.00 R20 and whose internal construction is similar to that of a conventional radial tire. Tires A corresponding to the first embodiment shown in FIG. 3 had the rib patterns including narrow cuts 5 having a width of 0.5 mm such that lengths of the cuts progressively decrease from those in extending corners 3 to retracting corners 4. The maximum length l' and the circumferential pitch P' of the cuts were 50% of the amplitude L of tread grooves 1 and 10% of zigzag pitch P, respectively. The cuts were not provided at the point ends of the retracting corners 4 of the ribs.

On the other hand, tires to be compared with these tires according to the invention included narrow cuts circumferentially arranged uniformly spaced with the pitch the same as that of the tires A and were substantially the same as the tires A with exception that lengths of the cuts are uniformly 50% of the amplitude of tread grooves.

Tires B corresponding to the second embodiment shown in FIG. 4 included narrow cuts 5 having a width of 0.5 mm such that depths of the cuts progressively decrease from those in extending corners 3 to retracting corners 4. The maximum depth d' and the circumferential pitch P' of the cuts were 60% of the depth D of tread grooves 1 and 10% of zigzag pitch P, respectively.

Tires to be compared with the tires B are substantially the same as the tires B with exception that depths of narrow cuts are uniformly 60% of depths of the tread grooves.

Tires C corresponding to the third embodiment shown in FIG. 5 included narrow cuts 5 having a width of 0.5 mm such that they are inclined with angles $\alpha$ progressively increasing from those in retracting corners 4 to extending corners 3. The maximum angle $\alpha'$ was 20° and the circumferential pitch P' of the cuts was 10% of zigzag pitch P. The cuts were provided in point ends 3' of the extending corners 3 of the ribs 2, whose inclined angles are zero or in radial directions of the tires. With these tires, lengths and depths of the cuts were 50% of the amplitude L of tread grooves 1 and 40% of the depth D of the tread grooves 1.

In the above embodiments, the cuts 5 are preferably provided in all the side edges of the ribs. The cuts may be, however, provided in one or more side edges of the ribs.

Tires to be compared with the tires C according to the invention were substantially same as the tires C with exception that narrow cuts are formed in radial surfaces of the tires ($\alpha = 0°$).

Figure 1:
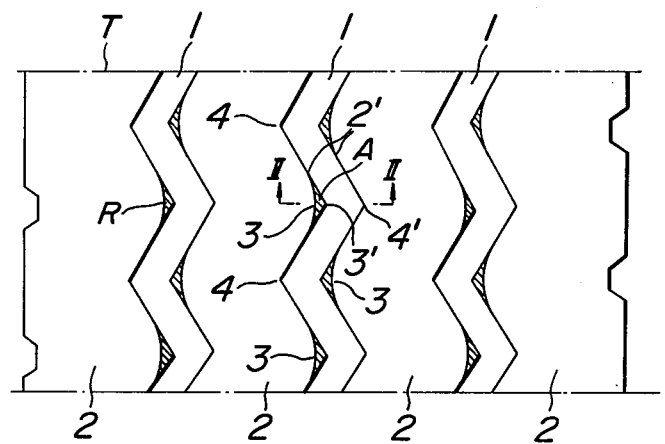
FIG. 1 is a development view of a tread pattern illustrating a worn condition in a prior art tire as described above.
Figure 2:
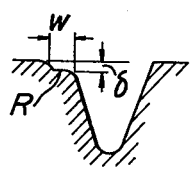
FIG. 2 is a sectional view of the rib taken along a line II—II in FIG. 1.

The tires were tested under conditions of 7.25 kg/cm² internal tire pressure, 100% standard load and 60 km/hour travelling speed. Widths w and depths $\partial$ (FIG. 2) of railway wear were measured after continuous running of 50,000 km and after further running, lives on wear of the tires were measured.

Results of the experiments are in the following Table wherein values of the prior art are 100 and values of the tires according to the invention are indexes to 100.

TABLE

| | | Width w of railway wear | Depth $\delta$ of railway wear | Life on wear |
|---|---|---|---|---|
| Conventional tires | | 100 | 100 | 100 |
| Tires according | A | 73 | 69 | 115 |
| to the | B | 79 | 71 | 110 |
| invention | C | 67 | 71 | 113 |

As can be seen from the above results, the tires according to the invention can prevent the railway wear to elongate the life on wear. With regard to the tires C, when the lengths of the narrow cuts 5 were gradually decreased from the maximum value at the extending corners 3 of the ribs equivalent to 50% of the amplitude of the tread groove 1 to minimum value at the retracting corners 4 and simultaneously the depths of the cuts were also gradually decreased from the maximum value at the extending corners 3 of the ribs equivalent to 60% of the depth of the tread grooves to the minimum value at the retracting corners 4, railway wear was still reduced and the life on wear was more elongated.

The invention can eliminate the disadvantages of the prior art and improve the characteristics of tires in comparison with the prior art.

It is further understood by those skilled in the art that the foregoing description is that of preferred embodiments of the disclosed tires and that various changes and modifications may be made in the invention without departing from the spirit and scope thereof.

What is claimed is:

1. A heavy duty pneumatic tire comprising; a tread surface divided along circumferential directions by at least two zigzag tread grooves having sides extending into said tread surface to form a plurality of circumferential zigzag ribs whose at least one side edge adjacent to said zigzag tread groove is formed with a plurality of narrow cuts opening into said tread grooves and substantially in parallel with an axial direction of the tire, said narrow cuts being formed so as to substantially continuously increase a rigidity of said rib from extending corners to retracting corners of said rib without any abrupt rigidity difference, and the depths of said narrow cuts are gradually reduced from those in said extending corners to those in said retracting corners.

2. A heavy duty pneumatic tire as set forth in claim 1, wherein the maximum depth of said narrow cuts is 40–90% of a depth of said tread groove.

3. A heavy duty pneumatic tire as set forth in claim 1 or 2, wherein said narrow cuts are circumferentially arranged with an interval 7.5–25% of a pitch of the zigzag of said tread groove.

4. A heavy duty pneumatic tire comprising a tread surface divided along circumferential directions by at least two zigzag tread grooves having sides extending into said tread surface to form a plurality of circumferential zigzag ribs whose at least one side edge adjacent to said zigzag tread groove is formed with a plurality of narrow cuts opening into said tread grooves and substantially in parallel with an axial direction of the tire, the improvement comprising said narrow cuts being formed so as to substantially continuously increase a rigidity of said rib from extending corners to retracting corners of said rib without any abrupt rigidity difference; said cuts between said extending and retracting corners are inclined relative to radial surfaces of the tire passing through openings of said cuts at said tread surface such that bottoms of the cuts are shifted away from said radial surfaces towards radial surfaces passing through the extending corners to form angles with their radial surfaces, said angles being progressively larger as said cuts are nearer said extending corners.

5. A heavy duty pneumatic tire as set forth in claim 4, wherein the angles of the cuts nearest said extending corners of said ribs are not more than 30°.

6. A heavy duty pneumatic tire as set forth in claim 4 or 5, wherein said cuts are circumferentially arranged with an interval 7.5–25% of a pitch of the zigzag of said tread groove.

7. A heavy duty pneumatic tire as set forth in claim 4, 5 or 6, wherein lengths of said narrow cuts are gradually reduced from those in said extending corners to those in said retracting corners of said rib.

8. A heavy duty pneumatic tire as set forth in claim 4, 5 or 6, wherein depths of said narrow cuts are gradually reduced from those in said extending corners to those in said retracting corners.

* * * * *